United States Patent Office 3,228,952
Patented Jan. 11, 1966

3,228,952
THIAZOLE THIOETHERS
Walter Reifschneider, Midland, Mich., assignor to The Dow Chemical Company, Midland, Mich., a corporation of Delaware
No Drawing. Filed June 27, 1962, Ser. No. 205,533
3 Claims. (Cl. 260—302)

The present invention is directed to thioethers and in particular is directed to novel thioethers corresponding to the formula

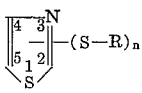

In the present specification and claims, R represents a member of the group consisting of alkyl being of from 1 to 12, inclusive, carbon atoms, cycloalkyl, and hydrocarbon aryl and alkylaryl being of from 6 to 10 carbon atoms, and $n$ is an integer from 1 to 3, inclusive. Because a radical —(S—R) in any of its $n$ occurrences is a substituent that replaces hydrogen, any said radical can be present only upon one of the positions numbered 2, 4 and 5 in the conventional designation.

The novel compounds are liquids of high boiling temperatures or solids appearing white or near white in mass, slightly soluble in water but readily soluble in various common organic solvents such as lower alkanols, benzene and the like. The compounds are useful as insecticides and herbicides: as inhibitors of the germination of fungus spores, they are effective fungistats. The compounds are also useful as additives to improve the properties of lubricating oils especially designed for operation under high pressures and temperatures; they are useful as wholly combustible alcohol denaturants and as intermediates in the preparation of dyestuffs and biologically active materials; they are also of value as solvent additives in the modification of behavior of mixed solvent systems.

The compounds are prepared by a process which comprises the steps of causing a reaction between a compound corresponding to the formula

wherein X represents halogen, and a mercaptan corresponding to the formula

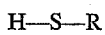

H—S—R

During the reaction to prepare the present compounds, $n$ molecules of mercaptan react with each molecule of thiazole halide. Small amounts of mercaptan may be lost in side reactions. Thus, when it is desired to prepare the present compounds in a high state of purity and with a minimum of necessary post-synthesis purification procedure, the starting reactants should be employed in equimolecular proportions, or preferably, with the mercaptan in slight excess. However,other proportions may be employed if desired, and unconsumed starting material of whatever identity may, if desired, be recycled into further synthesis process.

The reaction goes forward at temperatures over a wide range, but initiates most readily when heated to a temperature somewhat higher than room temperature; under these conditions the reaction is, in general, exothermic and goes forward to completion with good yield calculated upon the basis of consumed starting material. Hydrogen halide of reaction is evolved and means for its orderly disposal are advantageously provided.

Typically, in the preparation of the compounds of the present invention, reaction between the mercaptan starting material and the thiazole halide starting material will initiate and go forward only when there are employed a catalytic amount of both a source of cuprous ion and a nitrogenous base. Thus, in the preparation of many, and probably all of the present compounds, the employment of such catalyst is essential and critical, although the exact weight is not critical. Certainly the employment of such catalyst is in all cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salt may be employed. The employed weight is not critical, but may vary from a very small trace amount, less than $\frac{1}{100}$ of 1 molar percent, to as much as an amount equimolecular with either reactant or even greater. In general, the employment of larger amounts is accompanied by no major advantage and, being expensive, is not preferred.

The nitrogenous base may be ammonia, a primary, secondary, or tertiary aliphatic or aromatic amine or a nitrogenous heterocycle wherein the nitrogen acts, or is capable of acting, as a basic substance. Thus the present starting thiazole halides and thiazole thioether products usually suffice as nitrogenous base, especially when employed in slight excess. If desired, the nitrogenous base may be a naturally liquid substance which is employed as a reaction medium. Otherwise, such base is dissolved in inert liquid reaction medium.

It is preferred, at least in laboratory preparations, to employ nitrogenous base catalyst substance in sufficient excess that portions of it may also act as hydrogen halide acceptor and yet further portions may continue to function, unreacted, in the necessary catalytic manner. Thus it is usually more efficient to use a nitrogenous base other, and more reactive, than the starting materials or products of the present invention.

In carrying out the reaction to prepare the compounds of the present invention, the thiazole halide and the mercaptan are intimately mixed and blended, in any order and in desired amounts, with source of cuprous ion and nitrogenous base as hereinbefore described, and thereafter heated to a temperature at which reaction takes place promptly. In one convenient method of practicing the present method, the reaction temperature may be the reflux temperature of the liquid reaction medium. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction solvent is removed from the reaction mixture by distillation which can be a water or other azeotropic distillation. The resulting product residue is taken up in solvent, dried, purified by contact with an absorbent, and thereafter fractionally distilled or recrystallized. In another method, the said reaction mixture, hot from heating to the reaction temperature, is poured into a mixture of ice and an amount of concentrated hydrochloric acid stoichiometric with employed nitrogenous base catalyst, whereupon a precipitate forms from which the desired product can be extracted as a solvent-soluble fraction. Representative extraction solvents include diethyl ether, chlorinated hydrocarbons, and benzene. The said precipitate is extracted with solvent, the solvent extract dried over an inert drying agent such as, for example, anhydrous sodium sulfate or the like; the solvent vaporized and removed and the remaining product chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

*Example I.—2-(methylthio)thiazole*

A reaction mixture is prepared, consisting of 16.4 grams (0.1 mole) of 2-bromothiazole and 16 grams of cuprous oxide (technical grade) dispersed in a mixture consisting of 110 milliliters quinoline and 20 milliliters pyridine. The resulting reaction mixture is placed in a flask with means to admit gas reactant, under reflux, the reflux being equipped with a water trap. In this situation, the reaction mixture is heated to its reflux temperature (a pot temperature between approximately 160° and 200° C.) and stirred, and approximately 7.5 grams (0.15 mole) methyl mercaptan bubbled in during a period of an hour. Heating is thereafter continued for 6 hours to carry the reaction to completion. At the conclusion of the reaction time, the resulting hot mixture is permitted to cool, to about 100° C. and both quinoline and pyridine removed by water azeotropic distillation. As a result of these procedures, there is obtained a dark, semi-solid, amorphous residue. This residue is taken up in chloroform, filtered, decolorized over a highly activated charcoal ("Norite") and dried over anhydrous sodium sulfate. From the resulting dry chloroform solution, solvent is heated and vaporized to obtain a light-colored residual oil which is redistilled at subatmospheric pressure to obtain a pale yellow, oily 2-(methylthio)thiazole product.

*Example II.—2,4-bis(methylthio)thiazole*

In procedures essentially similar to the foregoing except that the starting thiazole compound is 2,4-dichlorothiazole and the starting mercaptan is employed in an amount approximately twice equimolecular therewith, there is prepared, in good yield, 2,4-bis(methylthio)thiazole, of the formula

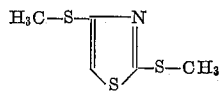

*Example III.—2,5-bis(cyclohexylthio)thiazole*

A reaction mixture is prepared consisting of 12.2 grams (0.05 mole) of 2,5-dibromothiazole, 7.2 grams technical cuprous oxide, 12 grams (approximately 0.1 mole) cyclohexanethiol dispersed together in 130 milliliters technical 2,4-lutidine and 60 milliliters quinoline (total lutidine-quinoline molarity, univalent, 1.65 moles) as mixed liquid reaction medium. The resulting reaction mixture is heated with stirring, at its boiling temperature and under reflux overnight (approximately 15 hours), the reflux condenser being equipped with a water separator. At the conclusion of the reaction time, the resulting hot mixture is poured directly into a mixture of chipped ice and 150 grams 40 percent hydrochloric acid (1.65 moles). As a result of these procedures, the ice melts and a solid separates in the resulting aqueous dispersion. This solid is collected by filtration and a chloroform extract made of it. The chloroform extract is washed twice with water and then dried over anhydrous sodium sulfate. From the resulting dry chloroform solution, chloroform solvent is evaporated, leaving a white solid which is recrystallized from methanol to obtain white crystals of 2,5-bis-(cyclohexylthio)thiazole of the formula

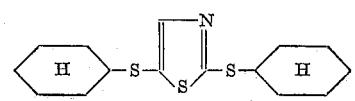

*Example IV.—2-(dodecylthio)thiazole*

A reaction mixture is prepared consisting essentially of 22 grams (0.1 mole) of dodecanethiol, 16.4 grams (0.1 mole) of 2-bromothiazole, and 8 grams cuprous oxide dispersed together in a mixture of 80 milliliters quinoline and 20 milliliters technical 2,4-lutidine as hydrogen halide acceptor, catalyst, and liquid reaction medium. The resulting reaction mixture is heated under nitrogen blanket for approximately 3 hours, at its boiling temperature and under water-trapped reflux and with stirring, to carry the reaction to completion. At the conclusion of the reaction time, the resulting hot mixture is permitted to cool, to about 100° C. and both quinoline and lutidine removed by water azeotropic distillation. As a result of these procedures, there is obtained a dark, semi-solid, amorphous residue. This residue is taken up in chloroform, filtered, decolorized over a highly activated charcoal ("Norite") and dried over potassium carbonate. From the resulting dry chloroform solution, solvent is heated and vaporized to obtain a dark-colored residual oil which is redistilled at subatmospheric pressure to obtain a yellow, oily 2-(dodecylthio)thiazole product boiling at 140° C. under absolute pressure of 0.3 millimeters mercury.

*Example V.—2-(ethylthio)-4-(phenylthio)thiazole*

The present synthesis takes advantage of the greater reactivity of a bromine substituent upon thiazole, than a chlorine substituent. In a mixture of 130 milliliters technical 2,4-lutidine and 60 milliliters quinoline, as mixed liquid reaction medium, is dispersed 39.7 grams (0.2 mole) of 2-bromo-4-chlorothiazole and 24.9 grams (0.2 mole) of the cuprous salt of ethyl mercaptan. The resulting reaction mixture is heated, with stirring at its boiling temperature and under reflux for 2 hours. Thereafter, there is added 22 grams (0.2 mole) of benzenethiol, as heating and stirring are continued. At the conclusion of the reaction time, the resulting hot mixture is permitted to cool, to about 100° C. and both quinoline and lutidine removed by water azeotropic distillation. As a result of these procedures, there is obtained a dark, semi-solid, amorphous residue. This residue is taken up in chloroform, filtered, decolorized over a highly activated charcoal ("Norite") and dried over potassium carbonate. From the resulting dry chloroform solution, solvent is heated and vaporized to obtain a light colored residual oil which is redistilled in vacuum to obtain a colorless, oily, 2-(ethylthio)-4-(phenylthio)thiazole having the structural formula

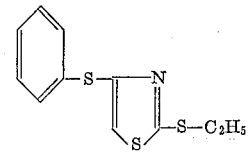

It is believed that if said viscous oil be seeded or otherwise successfully induced to do so, it would crystallize.

By employing the different reactivities of the different halogen substituents upon thiazole, and by using therewith predetermined molar amounts of reactants, it is possible to direct a predetermined mercaptan substituent to any predetermined ring carbon atom of the thiazole nucleus. For this purpose, the reactivity of the halogens follows the order of their molecular weight.

*Example VI.—2,5-bis(2-naphthylthio)thiazole*

A reaction mixture is prepared consisting essentially of 16.1 grams (0.1 mole) of 2-naphthalenethiol, 12.15 grams (0.05 mole) of 2,5-dibromothiazole and 1 gram cuprous bromide dispersed together in a mixture of 100 milliliters lutidine and 20 milliliters quinoline as hydrogen halide acceptor, catalyst, and liquid reaction medium. The resulting reaction mixture is heated for approximately 18 hours, at its boiling temperature and under reflux and with stirring, to carry the reaction to completion. At the conclusion of the reaction time, the resulting hot mixture is permitted to cool, to about 100° C. and both quinoline and lutidine removed by water azeotropic distillation. As a result of these procedures, there is obtained a dark, semi-solid, amorphous residue. This residue is taken up in chloroform, filtered, decolorized over a highly activated charcoal ("Norite") and dried over potassium carbonate. From the resulting dry chloroform solution, solvent is heated and vaporized to obtain a light-colored residual oil which is distilled at subatmospheric pressure to obtain a light-colored solid which is recrystallized from isopropanol to obtain white crystals of 2,5-bis(2-naphthylthio)thiazole which is a solid at room temperature and has a molecular weight of approximately 301.5 and is of the formula

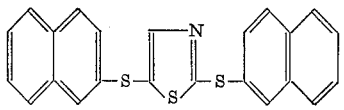

In the pure form, the product is practically odorless.

In procedures essentially the same as the foregoing, by the use of appropriate starting materials, other products of the present invention are prepared as follows:

From 2,5-dichlorothiazole and n-hexylmercaptan, in the presence of cuprous bromide and in liquid lutidine-quinoline mixture, 2,5-bis(n-hexylthio)thiazole.

From 2,4-diiodothiazole and n-octylmercaptan, in the presence of cuprous lactate and in a propanol solution of secondary n-butylamine, 2,4-bis(n-octylthio)thiazole.

I claim:
1. 2,4-bis(methylthio)thiazole.
2. 2,5-bis(cyclohexylthio)thiazole.
3. 2-(ethylthio)-4-(phenylthio)thiazole.

References Cited by the Examiner
UNITED STATES PATENTS

| | | | |
|---|---|---|---|
| 2,481,673 | 9/1949 | Knott et al. | 260—302 |
| 2,516,313 | 7/1950 | Goddin et al. | 260—302 |

OTHER REFERENCES

Buchman et al.: J. Org. Chem., vol. 6, pp. 764–773 (1941).

NICHOLAS S. RIZZO, *Primary Examiner.*

WALTER A. MODANCE, *Examiner.*